United States Patent

Razavi

[11] 4,022,762
[45] May 10, 1977

[54] WATER-SOLUBLE ACID AZO DYESTUFF CONTAINING A N-(p-SULPHOPHENOXYALKYL)-N-ALKYL AMINO GROUP

[75] Inventor: David Razavi, Paris, France

[73] Assignee: Produits Chimiques Ugine Kuhlmann, Paris, France

[22] Filed: Mar. 24, 1975

[21] Appl. No.: 561,388

Related U.S. Application Data

[63] Continuation of Ser. No. 339,798, March 9, 1973, abandoned, which is a continuation-in-part of Ser. No. 18,340, March 10, 1970, abandoned.

[30] Foreign Application Priority Data

Mar. 14, 1969 France .............................. 6907258

[52] U.S. Cl. .............................. 260/158; 260/157; 260/509; 260/570.5 R
[51] Int. Cl.² ................. C09B 29/08; C09B 31/04; D06P 1/08; D06P 3/24
[58] Field of Search ....................... 260/158; 8/41 B

[56] References Cited

UNITED STATES PATENTS

| | | | |
|---|---|---|---|
| 2,603,656 | 7/1952 | Martin .............................. | 260/509 |
| 2,603,657 | 7/1952 | Vinton .............................. | 260/510 |
| 3,478,011 | 11/1969 | Artz .............................. | 260/205 |
| 3,579,497 | 5/1971 | Ramanathan et al. ........... | 260/158 |
| 3,709,872 | 1/1973 | Koller .............................. | 260/207.1 |
| 3,840,517 | 10/1974 | Weaver et al. .................... | 260/157 |

FOREIGN PATENTS OR APPLICATIONS

| | | | |
|---|---|---|---|
| 45-29227 | 9/1970 | Japan .............................. | 8/41 B |
| 894,012 | 4/1962 | United Kingdom ............... | 260/158 |

OTHER PUBLICATIONS

Venkataraman, "The Chemistry of Synthetic Dyes", vol. I, p. 270 (1952).

Primary Examiner—Floyd D. Higel
Attorney, Agent, or Firm—Beveridge, De Grandi, Kline & Lunsford

[57] ABSTRACT

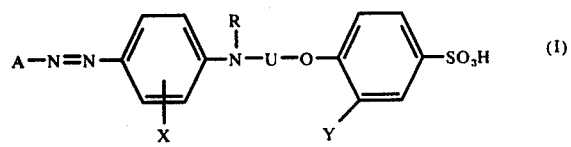

wherein A is 2-thiazolyl, 4-nitro-2-thiazolyl, 2-benzothiazolyl, 6-methoxy-2-benzothiazolyl, 6-ethoxy-2-benzothiazolyl, 6-chloro-2-benzothiazolyl, 5,6-dichloro-2-benzothiazolyl, 4-bromo-6-chloro-2-benzothiazolyl, 4,6-dibromo-2-benzothiazolyl, 4-bromo-6-methoxy-2-benzothiazolyl, 4-bromo-6-ethoxy-2-benzothiazolyl, 4-bromo-5,6-dichloro-2-benzothiazolyl, 6-methylsulfonyl-2-benzothiazolyl, 4-bromo-6-methylsulfonyl-2-benzothiazolyl, or 6-hydroxyethylsulfonyl-2-benzothiazolyl, X is hydrogen, chlorine, methyl or trifluoromethyl, R is alkyl containing 1 to 4 carbon atoms, U is alkylene containing 1 to 5 carbon atoms, and y is hydrogen, chlorine or methyl. The dyestuffs are useful for the dyeing and printing of polyamide fibers for which they have a good affinity for polyamides so that the tinctorial yield is excellent and the exhaustion of the dyestuffs is very good. The colorations obtained have a remarkable brilliance, good fastness to washing and to light and finally good covering of bars i.e. absence of streakiness.

4 Claims, No Drawings

WATER-SOLUBLE ACID AZO DYESTUFF CONTAINING A N-(p-SULPHOPHENOXYALKYL)-N-ALKYL AMINO GROUP

This application is a continuation of my co-pending Application Ser. No. 339,798 filed Mar. 9, 1973 (now abandoned) which in turn is a Continuation-in-Part of my Application Ser. No. 18340 filed Mar. 10, 1970 (now abandoned) and the entire disclosure of the two earlier applications is relied upon and is incorporated by reference.

The acid azo dyes selected at present for the dyeing of polyamide fabrics do not fulfil all the requirements of the dyer, which are: covering of bars, high tinctorial yield, brilliance and generally good fastness.

According to the present invention new water-soluble acid azo dyes are provided of general formula:

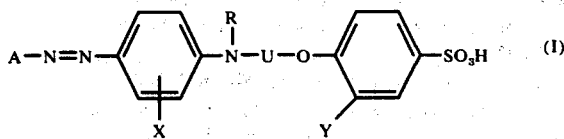

wherein A is 2-thiazolyl, 4-nitro-2-thiazolyl, 2-benzothiazolyl, 6-methoxy-2-benzothiazolyl, 6-ethoxy-2-benzothiazolyl, 6-chloro-2-benzothiazolyl, 5,6-dichloro-2-benzothiazolyl, 4-bromo-6-chloro-2-benzothiazolyl, 4,6-dibromo-2-benzothiazolyl, 4-bromo-6-methoxy-2-benzothiazolyl, 4-bromo-6-ethoxy-2-benzothiazolyl, 4-bromo-5,6-dichloro-2-benzothiazolyl, 6-methylsulfonyl-2-benzothiazolyl, 4-bromo-6-methylsulfonyl-2-benzothiazolyl, or 6-hydroxyethylsulfonyl-2-benzothiazolyl, X is hydrogen, chlorine, methyl or trifluoromethyl, R is alkyl containing 1 to 4 carbon atoms, U is alkylene containing 1 to 5 carbon atoms, and Y is hydrogen, chlorine or methyl.

Most acid azo dyes of general formula (I), thanks to their plastosolubility, have a very good affinity for polyamides so that the tinctorial yield is excellent and the exhaustion of the dyestuffs is very good. The colourations obtained have a remarkable brilliance, good fastness to washing and to light and finally good covering of bars i.e. absence of streakiness.

The dyes of formula (I) may be prepared for example by diazotizing an amine of formula A—NH₂ and coupling the diazo derivative in acid or buffered medium with a coupling component of the general formula:

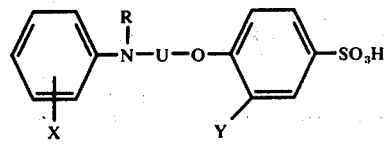

wherein A, X, R, U and Y have the same significance as above.

Some of these coupling components are already known and are mentioned as intermediate compounds in the preparation of photographic developers in U.S. Pat. No. 2,603,656. Others are new and may be obtained for example by condensation of an amine of the general formula:

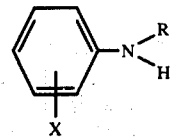

with a halogeno-alkyl arylether and sulphonation of the condensation product obtained.

In the following Examples which are purely illustrative the parts indicated are by weight unless otherwise stated.

EXAMPLE 1

13 parts of p-chloraniline dissolved in 100 parts of water and 25 parts of hydrochloric acid are diazotized by means of 7 parts of sodium nitrite at 0° C. and coupled at 0°–5° C. with 34.5 parts of the sodium salt of N-ethyl N-(2'-p-sulphophenoxy-ethyl) aniline dissolved in 200 parts of water and 10 parts of concentrated hydrochloric acid. After one hour of stirring at 0°–5° C. the pH is adjusted to approximately 3 by means of sodium acetate, the mixture is stirred overnight at ordinary room temperature, heated to 50° C. for a quarter of an hour, cooled to ordinary room temperature, filtered and dried at 50° C. 50 parts of a brown-red powder are obtained which dyes Nylon fibres in a yellow-gold shade which is fast to light and washing.

EXAMPLE 2

13 parts of p-chloraniline are diazotized as in Example 1 and coupled with 36 parts of the sodium salt of N-ethyl N-(2'-p-sulphophenoxy-ethyl) m-toluidine dissolved in 150 parts of water and 10 parts of concentrated hydrochloric acid. The coupling of the dye is completed as in Example 1 and, after drying of the dye, a brown-red powder is obtained which dyes Nylon in a golden-yellow shade, which is slightly more orange than that of Example 1 and also fast to light and to washing.

The sodium salt of N-ethyl N-(2'-p-sulphophenoxyethyl) m-toluidine used for the manufacture of this dye may be prepared by the following process:

A mixture of 453 parts of the β-bromoethyl ether of phenol and 608 parts of N-(monoethyl)m-toluidine is heated over one hour and a half to 95°–100° C., then over 7 hours to 115° C. to 120° C. and then a solution of 110 parts of sodium hydroxide dissolved in 225 parts of water is added; the mixture is decanted and the upper layer is separated. This is distilled in vacuum and the excess ethyl m-toluidine is recovered followed by N-ethyl N-(2'-phenoxy ethyl) m-toluidine which distils in a vacuum of 1.5 mm of Hg at 172°–173° C. (uncorrected). 531 parts of this product are obtained which solidifies after cooling. For the sulphonation 196 parts of the amine so prepared are added at between 50° C. and 60° C. to 174 parts by volume of 66° Be sulphuric acid. This mixture is then heated to 90° C., maintained for half an hour at that temperature, poured into 2000 parts of water, neutralized with approximately 540 parts by volume of a 40% solution of sodium hydroxide, cooled to 30° C. and precipitated by the addition of 700 parts of sodium chloride. The solid is filtered at that temperature, washed with a solution of 30% sodium chloride and dried at 50° C. A white powder is obtained which contains a little sodium chloride.

EXAMPLE 3

65 parts by volume of 66°Be sulphuric acid are added to a suspension of 27.5 parts of 6-ethoxy-2-aminobenzothiazole 91.4% in 80 parts of water. The mixture is cooled down to 0° C. and in 30 minutes 25 parts by volume of 2N sodium nitrite are added. Stirring is kept up for 1½ hours at between 0° C and 5° C. one part of sulphamic acid is added and then gradually 25 parts of the sodium salt of N-ethyl N(2'-p-sulphophenoxy ethyl)m-toluidine prepared as in Example 2. Stirring is continued for one hour at 0° C. then overnight at ordinary room temperature. The mixture is poured onto ice-water, stirred for one hour, the pH is adjusted to 8 by means of sodium hydroxide solution, filtered and dried at 50° C. 30 parts of a violet powder are obtained which dyes polyamide fabrics such as Nylon fabric in a red shade which is fast to washing and to light.

The following Table summarizes other Examples of dyestuffs in accordance with the invention prepared as in the previous Examples by diazotization of the A—$NH_2$ amine indicated in the second column and coupling of the diazo derivative with a coupling component of the formula:

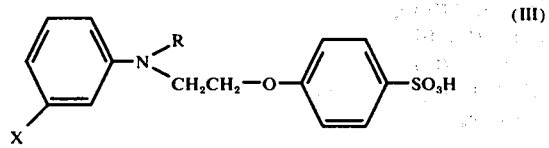

(III)

wherein X and R have the significances indicated in the third and fourth columns.

| Example | A—$NH_{A-NH2}$ | X | R | Shade on "Nylon" |
|---|---|---|---|---|
| 4 | p-chloraniline | H | methyl | golden yellow |
| 5 | o-chloraniline | H | ethyl | " |
| 6 | " | " | methyl | " |
| 7 | " | methyl | ethyl | orange-yellow |
| 8 | 5-chloro-2-methoxy-aniline | H | " | " |
| 9 | " | methyl | " | " |
| 10 | 3-amino-1,2,4-triazole | H | " | yellow |
| 11 | " | methyl | " | orange-yellow |
| 12 | 4-amino-azobenzene | H | ethyl | scarlet |
| 13 | " | " | methyl | scarlet |
| 14 | " | methyl | ethyl | scarlet red |
| 15 | 4-amino-3,2'-dimethyl azobenzene | H | ethyl | scarlet red |
| 16 | " | methyl | " | " |
| 17 | p-nitraniline | H | " | " |
| 18 | " | H | methyl | " |
| 19 | 2-amino-benzothiazole | H | ethyl | red |
| 20 | " | methyl | " | bluish red |
| 21 | 2-amino-6-ethoxy-benzothiazole | H | " | " |
| 22 | " | " | methyl | " |
| 23 | 2-bromo-4,6-dinitro-aniline | methyl | ethyl | bluish violet |
| 24 | 2-amino-4-nitro-thiazole | " | " | reddish blue |
| 25 | 4-amino-2',6'-dichloro-2,5-dimethoxy-4'-nitro azobenzene | " | " | navyblue |
| 26 | o-toluidine | " | " | yellow |
| 27 | p-toluidine | " | " | " |
| 28 | o-anisidine | " | " | " |
| 29 | p-anisidine | " | " | " |

EXAMPLE 30

13 parts of p-chloraniline are diazotised by means of 25 parts of hydrochloric acid and 7 parts of sodium nitrite and coupled with 36 parts of the sodium salt of N-ethyl N(2'-p-sulphophenoxy-ethyl)o-toluidine, dissolved in 200 parts of water and 10 parts of concentrated hydrochloric acid. The coupling is completed as in Example 1 and a brown-red powder is obtained which dyes Nylon fabrics in a yellow shade.

The sodium salt of N-ethyl N-(2'-p-sulphophenoxyethyl)o-toluidine may be prepared by the following process: A mixture of 135 parts of N-(monoethyl)-o-toluidine and 100 parts of the β-bromoethyl ether of phenol is heated for one hour up to 120° C. and maintained at this temperature overnight. Then a solution of 24 parts of sodium hydroxide dissolved in 100 parts of water is added, the mixture is decanted and the upper layer is separated. This material is distilled under a vacuum of 1.5 mm of Hg and the fraction that distils between 162° C. and 172° C. is collected. The sulphonation of the amine is effected as in Example 2 and a water-soluble white powder is obtained.

EXAMPLE 31

The same operation is carried out as in Example 3, but the 27.5 parts of 6-ethoxy-2-amino-benzothiazole are replaced by 21.3 parts of 2-amino-benzothiazole and the 25 parts of sodium salt of the N-ethyl N-(2'-p-sulfophenoxy-ethyl) m-toluidine are replaced by 26 parts of sodium salt of the N-ethyl N-[2-(4-sulfo-2-methyl-phenoxy)-ethyl] m-toluidine. The sodium salt of N-ethyl N-[2-(4-sulfo-2-methyl-phenoxy) ethyl]m-toluidine used in this Example may be prepared by using the operation mentioned in the second paragraph of Example 2, but by replacing the 453 parts of β-bromoethyl ether of phenol by 485 parts of the β-bromoethyl o-ether of cresol.

The following Table summarises other Examples of dyestuffs in accordance with the invention and which have been prepared as in the preceding Examples from the A—$NH_2$ amine mentioned in the second column.

These dyestuffs may be represented by the formula:

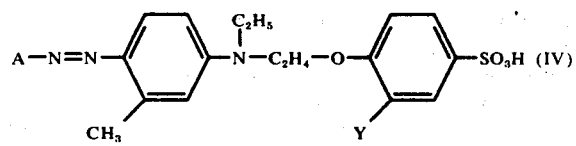

(IV)

| Example | A—$NH_2$ | Y | Shade on Nylon |
|---|---|---|---|
| 32 | 2-amino-thiazole | H | orange red |
| 33 | 6-chloro-2-amino benzothiazole | H | violet red |
| 34 | 4-bromo-6-chloro-2-amino-benzothiazole | H | reddish violet |
| 35 | 4-bromo-5,6-dichloro-2-amino benzothiazole | H | " |
| 36 | 4-bromo-5-methylsulfonyl-2-amino benzothiazole | H | " |
| 37 | 6-methoxy-2-amino-benzothiazole | H | red |
| 38 | 4,6-dibromo-2-amino benzothiazole | H | reddish violet |
| 39 | " | methyl | " |
| 40 | 5,6-dichloro-2-amino-benzothiazole | H | violet red |
| 41 | " | methyl | " |
| 42 | 6-methylsulfonyl-2-amino-benzothiazole | H | " |
| 43 | " | methyl | " |
| 44 | 4-bromo-6-methoxy-2-amino-benzothiazole | H | " |
| 45 | " | methyl | " |
| 46 | 4-bromo-6-ethoxy-2-amino-benzothiazole | H | " |
| 47 | " | methyl | " |

I Claim:
1. Water-soluble acid azo dyestuff of the formula:

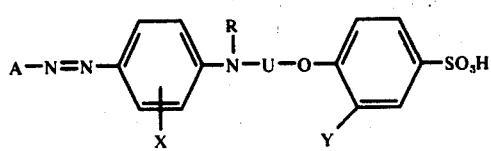

wherein A is 2-thiazolyl, 4-nitro-2-thiazolyl, 2-benzothiazolyl, 6-methoxy-2-benzothiazolyl, 6-ethoxy-2-benzothiazolyl, 6-chloro-2-benzothiazolyl, 5,6-dichloro-2-benzothiazolyl, 4-bromo-6-chloro-2-benzothiazolyl, 4,6-dibromo-2-benzothiazolyl, 4-bromo-6-methoxy-2-benzothiazolyl, 4-bromo-6-ethoxy-2-benzothiazolyl, 4-bromo-5,6-dichloro-2-benzothiazolyl, 6-methylsulfonyl-2-benzothiazolyl, 4-bromo-6-methylsulfonyl-2-benzothiazolyl, or 6-hydroxyethylsulfonyl-2-benzothiazolyl, X is hydrogen, chlorine, methyl or trifluoromethyl, R is alkyl containing 1 to 4 carbon atoms, U is alkylene containing 1 to 5 carbon atoms, and Y is hydrogen, chlorine or methyl.

2. Dyestuff according to claim 1 wherein R is methyl or ethyl and U is ethylene.

3. The dyestuff of the formula:

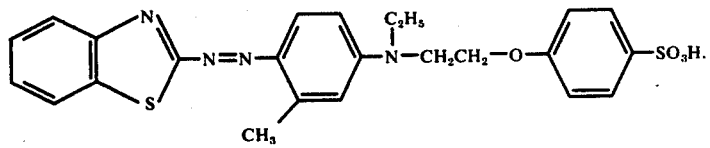

4. The dyestuff of the formula:

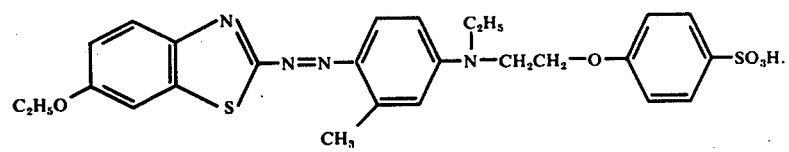

* * * * *